Dec. 1, 1931.  J. LEDWINKA  1,834,526
PRESSED METAL VEHICLE BODY
Filed Dec. 6, 1929  3 Sheets-Sheet 1

INVENTOR.
JOSEPH LEDWINKA
BY John P. Barbor
ATTORNEY.

Dec. 1, 1931. J. LEDWINKA 1,834,526
PRESSED METAL VEHICLE BODY
Filed Dec. 6, 1929 3 Sheets-Sheet 2

INVENTOR.
JOSEPH LEDWINKA.
BY
John P. Tarbox
ATTORNEY.

INVENTOR.
JOSEPH LEDWINKA
BY
John P. Tarbox
ATTORNEY.

Patented Dec. 1, 1931

1,834,526

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

PRESSED METAL VEHICLE BODY

Application filed December 6, 1929. Serial No. 412,040.

My invention relates to pressed metal vehicle bodies and more particularly to such bodies in which the outer paneling and the framing for the door and window opening are comprised in large part by integral stampings of large extent, and of relatively light gauge metal, such as is disclosed, for example, in my prior application Serial No. 159,827 for pressed metal vehicle body filed January 8, 1927.

It is a main object of my present invention to simplify the construction of such bodies and to reduce the cost of manufacture, without any sacrifice of strength and rigidity and durability, and I accomplish this in large part by splitting up the interior reinforcing structures into a number of separate small stampings, which can thus be made out of what would otherwise be scrap metal, by so forming these interior reinforcing stampings that they may be most readily secured to the outer panel stamping by that easiest and surest of methods of joinder of sheet metal, namely spot welding, and by such an arrangement of the interior reinforcements as to permit the ready assembly therewith of the interior trim, doors and windows and associated parts.

Other and further objects and advantages will appear from the following detailed description when read in connection with the accompanying drawings.

Figure 4:
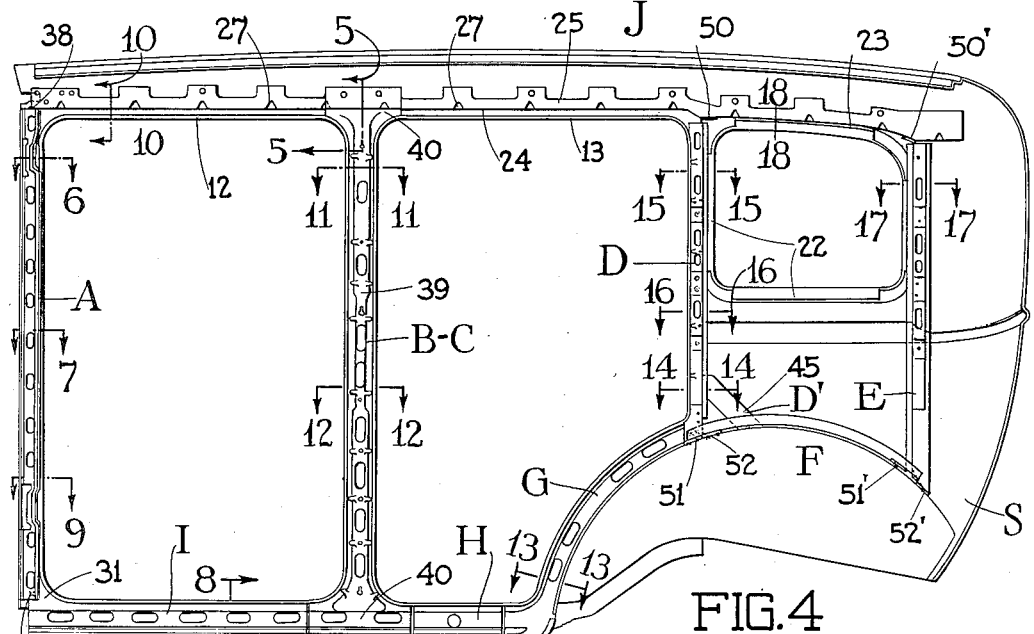
Fig. 4 shows the assembled side wall unit in side elevation.
Figure 5:
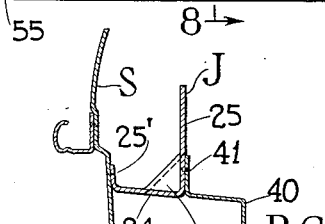

Figs. 5 to 18, inclusive, are detail sectional views taken on the correspondingly numbered section lines indicated on the assembly view of Fig. 4.

Figure 1:
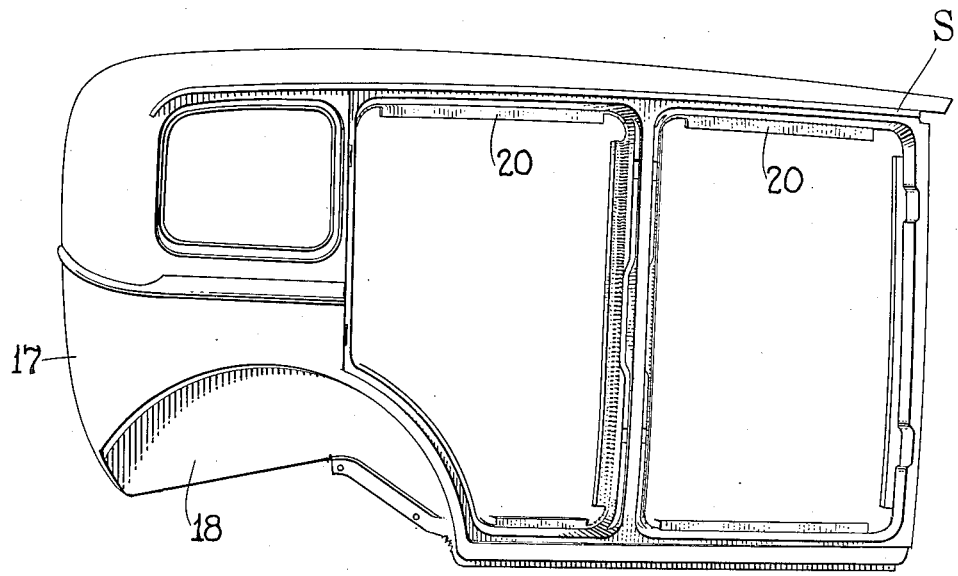
Figs. 1 and 2 show in perspective views, as seen from the outside and inside, respectively, an outer panel stamping forming the main element of the novel improved side wall unit.
Figure 2:
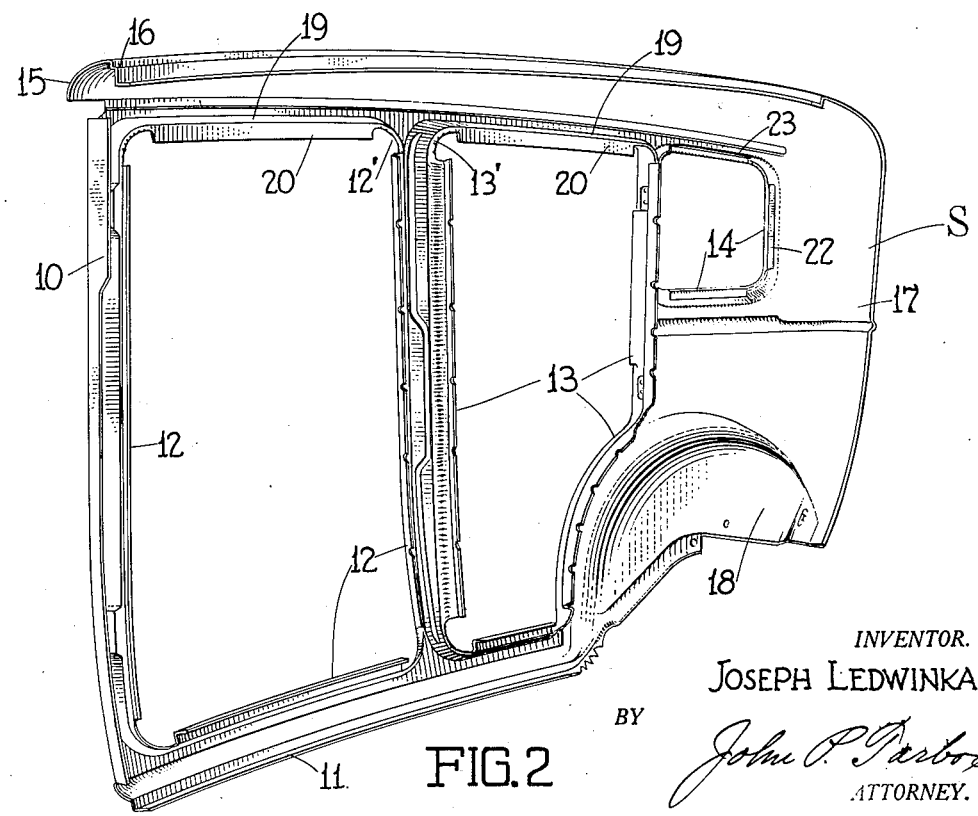

Prior to the assembly, the main element, namely, the outer side panel S of the improved side unit is of the form shown in Figs. 1 and 2. It is a relatively deep drawn stamping flanged inwardly at its forward edge, as at 10, at the bottom, as at 11, around the front and rear door openings, as at 12 and 13, respectively, at the rear quarter window as at 14, is extended inwardly on a curve at the top as at 15 to form the side quarter of the roof having a rabbeted edge conformation as 16 to receive the roof, and at the rear it is extended inwardly on a curve as 17 to form the rear quarter, its edge being adapted to be joined to an adjacent rear panel (not shown) in any manner desired. It is also formed with the wheel housing depression 18. So constituted, the side unit outer panel stamping is relatively rigid and self-sustaining although made of relatively light gauge sheet metal, but to further strengthen and stiffen it and adapt it for the attachment of doors, and elements associated therewith, trim, etc. and to provide a rigid unitary side sub-assembly which is produced very economically and yet has all the advantages of the double walled construction shown in the prior application above referred to, I provide the following additional relatively small reinforcing stampings to be associated therewith in the manner to be hereinafter described. These additional elements are shown separately in Fig. 3 and comprise a front post reinforcing member A, an intermediate or B—C post reinforcing stamping B—C, a D-post reinforcing member D and its associated angle D' rising between the rear doorway and the rear quarter window opening, an E-post member E at the rear edge of the window opening, a wheel housing reinforce F, a combined D-post, wheel housing and threshold reinforcing member G, the threshold members H and I, respectively, for the rear and front doorways and the top rail member J.

Figure 3:
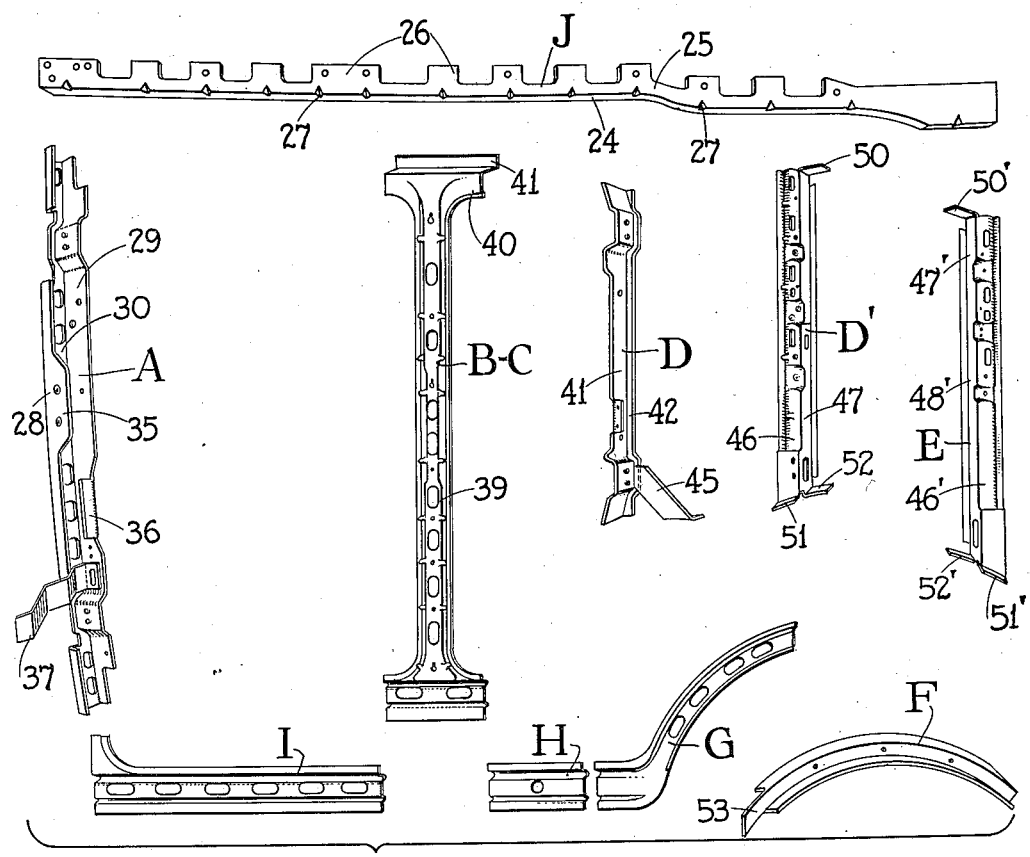
Fig. 3 shows in perspective the various parts of the inner reinforcing structure to be applied to the outer panel stamping shown in Figs. 1 and 2 in their approximate relative position.
Figure 17:
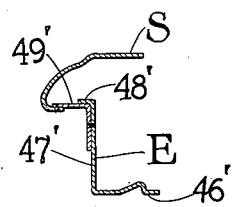
Figure 14:
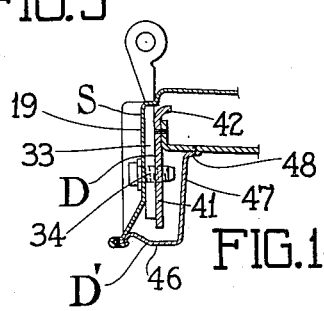

When these parts shown separately in Fig. 3 are assembled with the outer panel S shown in Figs. 1 and 2, the completed side unit sub-assembly for the body shown in Fig. 4 results. This construction will now be described in detail.

Figure 10:
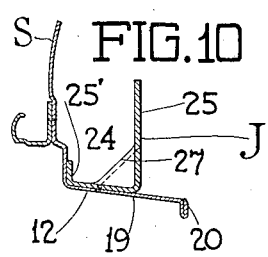

As is clearly shown in Fig. 10, the panel 100

S above the doorway openings is flanged inwardly at 12, 13 to the full depth of the door to form the door jamb and is provided along its inner edges with lateral flange as 20, which is reversely crimped upon itself to form a finished and reinforced door overlap. In the views of Figs. 1 this flange is shown with a slight bend extending longitudinally, along which bend, the final crimping over is effected. The remaining side margins of the doorways are formed with like lateral flanges to form the door jambs along those edges they are joined and rendered continuous in the corners of the doors by the rounded portions 12′, 13′. The lateral edge flanges, as 20, also extend completely around the doorway opening, but are somewhat shallower in the corners to facilitating the crimping over operation at those places.

Figure 6:
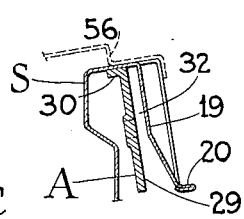
Figures 7, 8:
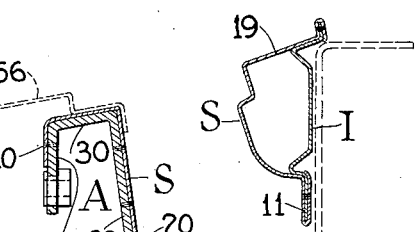
Figure 9:
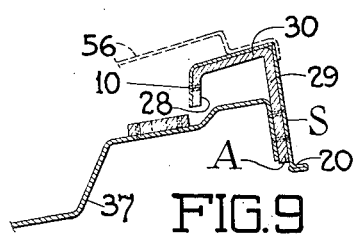

As clearly appears in Figs. 6, 7, and 9, the flanges 20 at the front post portion of the panel are reversely bent back upon themselves in a manner similar to the flanges at the top of the doorway openings. In their remaining portions the flanges are joined to the reinforcing members in a manner to be hereinafter described.

Figure 18:
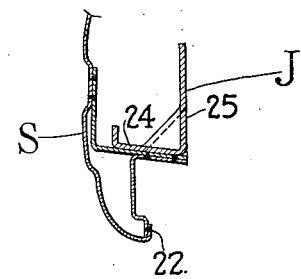
Figure 15:
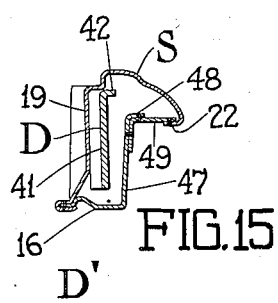

As shown in Figs. 2 and 18, the outer panel stamping S is flanged inwardly as at 14 around the rear quarter window opening to substantially the plane of the window, and these flanges 14 are formed around the window with laterally extending edge flanges as 22 extending substantially in the plane of the body of the panel. At the top the flange 22, is formed with an inwardly extending edge flange 23, extending across the plane of the window glass panel.

This flange 23 is slightly downwardly offset from the inwardly extending flanges 19 at the tops of the doors.

The angular top rail reinforce J is correspondingly offset and extends from the front or A-post to and beyond the E-post, its lower substantially horizontally extending arm 24 resting on and being rigidly secured as by spot welding to the door jamb portions 12, 13, at the tops of the doorways and to the flange 23 at the top of the rear quarter window. The rail J has an inner vertically extending arm 25 which is offset outwardly with respect to the inner edges of the flanges 12, 13 to permit a part of the trim securing means such as tacking strips (not shown) to be seated in the angle so formed. The arm 25 is formed at intervals with upwardly extending tabs or extensions 26, to which the trim extending from the tops of the doors and windows to the roof is secured. If desired the trim can, of course, be additionally secured to the arm 25 at intermediate points.

For further strength and stiffness the outer edge of the arm 24 may be formed with a narrow upwardly extending flange 25′, thus forming, in effect, a channel section rail having side walls of unequal depth. The wide arms 24 and 25 of the rail are further interbraced and reinforced, particularly at the locations of the vertically extending tabs or extensions 26 through which the trim is secured, by spaced notches or depressions 27 formed at the angle joining said arms, these depressions on the outside of the rail forming integral braces on the inner side of the rail extending between the arms of the angle, see Fig. 5.

At the A-post, the outer panel is of channel section having the shallow forward wall formed by the inwardly extending flange 10 and the relatively wide rear wall formed by the jamb forming inwardly extending flange 12 extending around the doorway, and it is reinforced by the generally channel section reinforcing member A having front and rear side walls 28, 29 and a bottom wall 30 nesting with the channel section of the panel as clearly appears in Figs. 7 and 9 and secured thereto by spot welding the adjacent side walls of the panel channel and reinforcing channel together.

The rear wall 29 of the reinforcing channel is substantially the width of the jamb and the reinforcing channel, which extends from the top rail to a point 31 adjacent the bottom of the outer panel, is of considerably heavier gauge than the panel, whereby to provide a strong foundation for the securement of the door hinges and other attachments. At the top and bottom hinge locations the bottom of the channel of the reinforce is in large part cut away as is also the front side wall of the channel, so that the reinforcing member in these regions has the angular cross section shown in Fig. 6. The rear side wall 29 of the reinforcing member and the flange 12 of the jamb portion of the panel are forwardly offset at these regions, the wall 29 of the reinforce A more than the flange 19, thereby leaving a space 32 between them for the reception of a hinge member 33 secured by bolting means 34 extending through aligned holes in the panel, hinge member and reinforce, not shown in Fig. 6, but clearly shown in Fig. 14 in which the construction is essentially the same as applied to the D-post. The offset in the jamb face portion 19 of the panel is for the purpose of receiving the head of the securing means within the general plane of the jamb face.

The bottom wall 30 of the channel reinforce may be lightened by spaced holes, as shown. The front side wall 28 is widened intermediate its ends as at 35 to provide means for attaching the instrument board, and the rear wall is formed in its lower portion with a forwardly extending flange 36 for the securement of a cowl brace thereto. Adjacent the lower hinge a bracket strip 37 is welded to the rearward wall 29 of the reinforce, said strip serving also to brace the cowl and to mount a guide (not shown) for the door check (also not shown herein).

At the top the reinforcing member A is secured to the top rail J by gas welding or otherwise securing the abutting end portions at the point indicated by 38.

Figure 11:
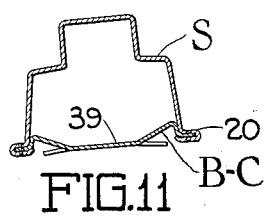
Figure 12:
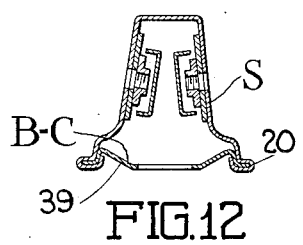

At the B—C post, the outer panel stamping is of inwardly presenting channel form, also as shown in Figs. 2, 11 and 12, the side walls of the channel are interbraced and interconnected by a substantially flat panel strip stamping 39 having lateral extensions 40 at top and bottom extending around the curved corners of the doorway openings and into the threshold at the bottom. This strip is connected to the side walls 12, 13 of the channel which forms the lock jambs of the front and rear door openings by a locked crimped joinder similar to that shown and described in my earlier application above referred to, except that in this case, the extreme lateral edge flanges 20 extending around the doorway openings are crimped over the edges of the inner panel reinforce, thereby avoiding any joint showing on the outside. This same joinder is effected between the bottom edge of the outer panel stamping and the bottom edge of the reinforce stamping 39, the inwardly extending edge flange 11, see Fig. 2, of the outer panel being crimped over the bottom edge of the panel strip 39, as clearly shown in Fig. 8.

At the top the inner panel strip 39 is outwardly offset to form the transverse portion 40 in the plane of the top jamb portions 12, 13 of the flanges of the outer panel stamping extending around the door openings, the offset portion 41 beyond this shoulder overlapping and being secured by spot welding to vertical arm 25 of the top rail J.

The D-post reinforce D shown separately in Fig. 3, comprises a stamping of relatively heavy gauge metal, as compared with the outer panel stamping S, which is generally of angle shape in cross section having a wide arm 41 seated against the rear jamb face 19 of the rear doorway opening and secured thereto, as by spot welding, and an outer narrow arm 42. The reinforce D and the jamb face portion 13 of the outer panel stamping S are both offset, at the hinge locations as is clearly shown in Figs. 3 and 14 in a manner entirely similar to the construction shown and described in connection with the A-post and for a like purpose. The D-post reinforce is braced to the wheel housing of the outer panel by an inclined brace 45 secured thereto and to the wheel housing.

Figure 16:
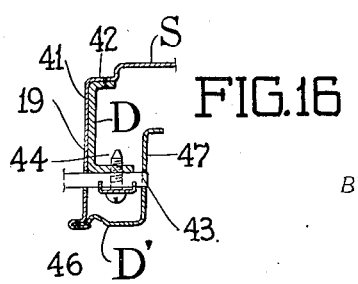

Adjacent its lower end the reinforcing member D is provided at its inner edge with a rearwardly extending tab, for the securement of a door stop guide 43, Fig. 16, extending through the jamb rail portion 19 of the outer panel, and secured to the tab, as by means of a screw or screws 44.

To further strengthen the D-post structure and provide substantially flat inner surface for the trim and means for guiding and securing the rear quarter window, a further angular member D' of relatively light gauge similar to the outer paneling is secured along the edge of one of its arms 46 to the inner edge of the outer flange by a crimped joinder similar to that hereinbefore described in connection with the B—C post. The other arm 47 extends transversely and it may form the bottom wall of a glass runway or receive the bottom of a separate glass runway, not shown, its outer edge being formed with a narrow lateral flanges 48 in the plane of the flange 22 of the outer panel stamping S extending around the rear quarter window, and is connected to the forward vertical portion of said flange, as by the angle brackets 49 spot welded thereto, thus forming with the flange 22 the outer side wall of the glass runway, or glass runway receiving channel.

At the top the stamping D' is secured by a tab 50 extending from its arm 47 and welded to the horizontal arm 24 of the angular reinforce J. At the bottom it is joined securely to the wheel housing by welding the laterally extending tabs 51 and 52 forming extensions of its arms 46 and 47, respectively, to the wheel housing.

The E-post stamping E is essentially similar to the stamping D' except that it faces in the opposite direction. Like stamping D' it comprises an inner arm 46' extending in the plane of the wall and forming a surface for the attachment of window moulding, regulator panel and trim, and a laterally extending arm 47', a narrow outer flange 48' secured to flange 22 of the outer panel stamping S through angular brackets 49', tab 50' secured to the reinforcing member J, and tabs 51' and 52' secured to the wheel housing.

At the bottom the vertical post stampings D' E are further interconnected and interbraced by a curved stamping of substantially Z-section, see Figs. 3 and 4 which is secured to the wheel housing by spot welding through one arm of the Z, and thus reinforces the housing in the region where the fender is attached, the vertically extending arm 53 of the Z is extended at each end and spot welded to the arms 47 and 47' of the post stampings D' and E.

Figure 13:
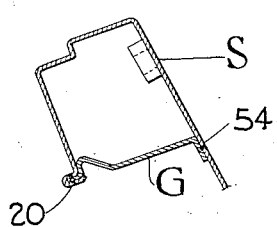

Along the forward portion of the wheel housing the outer panel stamping is of inwardly facing channel section as clearly appears in Fig. 13 and forms the lower curved portion of the post D. On its inner side it is reinforced by a substantially flat stamping G which is extended down into the threshold of the rear door opening. In the edge of the door opening, this stamping is joined to the edge of the jamb face portion 13 of the outer panel stamping by crimping the inner edge flange 20 over the edge of the stamping G both in the D-spot region and in the threshold portion. In the D-post region, the stamping G is provided with a lateral flange 54 spot welded to the wheel housing, and in the threshold portion the connection at the lower edge of the stampings is similar to that shown in Fig. 8.

The upper end of the stamping G overlaps and is secured by spot welding to the D-post stamping D'.

Between the threshold portion of the inner reinforcing stamping B—C for the B—C post and the corresponding portion of the stamping G, a short reinforcing stamping H is inserted to interbrace the opposite side walls of the rear door threshold portion of the outer panel stamping. This is secured in the margin of the door opening and in the lower margin in the manner hereinbefore described and clearly shown in Fig. 11. A similar strip stamping I, similarly secured forms the inner side wall of the threshold of the front door opening. It extends from the threshold portion of the B—C stamping to the A-post and may be extended as shown, around the curved corner of the door opening and secured at 55 by spot welding to the bottom of the channel section A-post reinforcing stamping.

In Figs. 6, 7 and 9, there is shown in dotted lines a cowl panel 56 forming a part of a cowl unit adapted for final assembly with the side unit herein described and having its rear edge formed to nest with the outer rear corner of the A-post portion of the side unit and secured thereto by spot welding.

Where the inner and outer panels are joined by crimping, they may be, and preferably are, additionally secured together by spot welding.

By the foregoing construction the outer panel stamping and all of the inner reinforcing and bracing members, as shown in Fig. 3 may be made, with the exception of the hinge post reinforcing stampings A and D, of relatively light gauge sheet steel, and the inner reinforcement is at the same time so distributed, that it may be made in a number of separate small stampings, thus permitting the utilization of the scrap produced by the cutting of the door openings and window openings in the outer stamping, and the various joints are of such an open construction that the parts may be joined together almost wholly by that most economical and sure method of joinder of light gauge sheet metal, namely, spot welding. By the arrangement of the interior reinforcing as described, the inner trim, the door mounting accessories and the rear quarter window mounting, etc., may be most easily effected, thus resulting in further economies in the assembling operations of the complete side unit.

While I have herein described a specific side wall construction for vehicle bodies which has been found to result in marked economies in manufacture, and to provide a strong and rigid construction of extremely light weight, it will be understood that changes and modifications may be made by one skilled in the art from the precise construction described, and in the appended claims. I desire to include such changes and modifications as fall clearly within the spirit and scope of the invention.

What I claim is:

1. A wall construction for vehicle bodies comprising a unitary sheet metal stamping extending around a doorway opening and flanged inwardly at the doorway opening to form the jamb face of a door post, and a reinforcing strip extending from top to bottom of the door post and secured to said jamb face portion, and provided with offset portions to receive the hinges between itself and said jamb face portions.

2. A wall construction for vehicle bodies comprising a unitary stamping forming the outer paneling above and below and between the doorway openings and flanged inwardly to form the door jamb faces, the horizontal faces joining the vertical faces through rounded corner portions, and an inner reinforcing panel stamping extending through the vertical portion between the doorway openings and around the curved portions at top and bottom and terminating in the thresholds and at the horizontal top portions of the doorway openings, said reinforcing panel being joined to said inwardly extending flanges of the first-named stamping.

3. A side wall construction for vehicle bodies comprising a unitary panel stamping extending around a doorway opening and flanged inwardly at the doorway opening to form the jamb face of the door, and further flanged inwardly at its vertical forward edge to form with the door edge flange, an inwardly facing channel section portion and a channel section reinforce nested with said inwardly facing channel portion and secured thereto along its side walls.

4. A side wall construction for vehicle bodies comprising an outer panel stamping extending around the door and window openings and flanged inwardly at the tops of said door and window openings to form the jamb faces of the doors and the top of the window runways, respectively, and an angular reinforce having one arm thereof seated on and secured to said flanges and a vertically extending arm offset outwardly from the inner edge of the flanges at said doorway openings.

5. A side wall construction for vehicle bodies comprising an outer panel stamping flanged inwardly at the tops of the doorway openings to form the door jamb faces, and an angular reinforce having one arm secured to said flanges and another arm extending vertically in outwardly offset relation to the inner edges of said flanges, said upwardly extending arm being provided with tabs through which the trim may be secured.

6. A side wall construction for vehicle bodies, comprising a unitary stamping flanged inwardly above a doorway opening to form the door jamb and a reinforcing rail of angular section having one of its arms secured to said flange and the other arm extending vertically, the rail being formed at spaced intervals with angular strengthening indentations extending across the angle between said arms.

7. A side wall construction for vehicle bodies comprising a unitary outer panel stamping extending across the tops of two adjacent doorway openings and downwardly between said openings to form the door post between them, and formed in the margins of said openings with inwardly extending flanges forming jamb faces of the doors, a top rail of angular form having one arm thereof secured to the horizontal flanges at the tops of the doorway openings, and a vertical arm outwardly offset with respect to the inner edges of said flanges, and a reinforcing panel connecting the inner edges of said vertical post portion of the outer panel having its upper end outwardly offset and secured to the vertical arm of said rail.

8. A wall construction for vehicle bodies, having the outer paneling flanged inwardly the full depth of the doorway opening to form the jamb of a door post, an angular reinforce having an arm seated against said flange and secured thereto, and formed with offset portions at top and bottom to provide with the flange recesses to receive the door hinge leaves.

9. A wall construction for vehicle bodies having the outer panel stamping flanged inwardly along the vertical edge of a doorway opening to the full depth of the doorway to form the jamb face of a door post, and an angular reinforcing member having one arm thereof seated against said flange and secured thereto, and a lateral tab extending from said arm for securing a door check guide.

10. A wall construction for vehicle bodies comprising an outer panel stamping flanged inwardly at a doorway opening to form a vertical and the upper jambs of the door and formed with a wheel housing portion, an angular reinforcing member having one arm thereof secured to said upper jamb face portion and an angular inner panel member having one arm secured to the edge of said vertical jamb portion and formed with tabs at its upper and lower ends, respectively secured to said reinforcing member and wheel housing.

11. A side wall construction for vehicle bodies comprising an outer panel stamping extending around a window opening and extended inwardly at the sides of the window opening and formed with a vertical edge flange extending parallel to the body of the panel, an angular reinforce extending along said vertical edge flange and secured to the panel at top and bottom, and angular tabs secured through their arms respectively to said flange and to said reinforce.

12. A wall construction for vehicle bodies comprising an outer panel stamping extending around a doorway opening and flanged inwardly in the margin of the doorway opening to the full depth of the doorway opening to form the jamb face of the door, and further flanged laterally in the plane of the wall to form a door overlap, said door overlap portion being reinforced by being reversely bent upon itself.

13. A wall construction for vehicle bodies comprising an outer panel stamping flanged inwardly around the rear quarter window opening and then laterally in the plane of the wall and formed with a wheel housing portion below said window having a curved crown, angular vertical reinforcing members secured to the lateral flanges of the outer panel at the side of the window opening and extended down to the wheel housing and a reinforcing member secured to the crown of the wheel housing portion and connecting the lower ends of said vertical members.

14. A vehicle body construction comprising an outer panel stamping flanged inwardly at the door openings to form the vertical jamb thereof, and a reinforcing member applied and secured to the inner side of said jamb face portion and extending through the greater portion of the length of the vertical jamb, said reinforce and panel being inwardly offset at the hinge locations, the reinforce more than the panel to receive the hinge leaves between the panel and reinforce.

15. An angular top rail for vehicle body constructions extending from the front post to and beyond the rear quarter window opening and having a vertical arm adapted to serve for the fastening of trim and a transverse arm for securement to the tops of the door and window jambs, said horizontal and vertical arms being interbraced by spaced indentations formed in the angle joining them.

16. A side unit for vehicle bodies comprising an integral panel stamping extending from the front post to and around the rear quarter and having formed therein all the doors and window openings in the side of the body, said panel being flanged inwardly at the door and window openings and in its front and bottom edges, thereby providing an intercommunicating channel section extending around the sides and bottom of a doorway opening, and separate reinforcing members secured to the side walls of the channel section in each of the sides and bottom of the doorway opening.

17. A wall construction for vehicle bodies comprising an outer panel stamping extending around the rear quarter window opening and flanged inwardly around said opening and around the vertical edge of an adjacent doorway opening and formed in its lower portion with a wheel housing depression, in combination with an inner reinforcing structure comprising an angular member extending horizontally above the window opening and secured to the adjacent flange of the outer panel, vertical members secured to said horizontal member and to the respective front and rear flanges of the outer panel in the margins of the window opening, the lower ends of said vertical members being secured to the crown of the wheel housing depression and a reinforcing member conforming to the crown of the wheel housing interconnecting the ends of said vertical members.

In testimony whereof I hereunto affix my signature.

JOSEPH LEDWINKA.